United States Patent [19]

Bozanic

[11] Patent Number: 5,484,502

[45] Date of Patent: Jan. 16, 1996

[54] UV-HARD COAT TRANSFER

[75] Inventor: Larry M. Bozanic, Westland, Mich.

[73] Assignee: Ford Motor Company, Dearborn, Mich.

[21] Appl. No.: 562,166

[22] Filed: Aug. 3, 1990

[51] Int. Cl.[6] .................................................. B44C 1/165
[52] U.S. Cl. ........................... 156/235; 156/238; 156/289
[58] Field of Search ................................... 156/230, 231, 156/238, 232, 233, 314, 289, 235

[56] References Cited

U.S. PATENT DOCUMENTS

| | | | |
|---|---|---|---|
| 4,166,150 | 8/1979 | Mattor et al. | 156/289 |
| 4,294,641 | 10/1981 | Reed et al. | 156/234 |
| 4,326,005 | 4/1982 | Reed et al. | 428/201 |
| 4,388,137 | 6/1983 | McCarty et al. | 156/230 |
| 4,464,456 | 8/1984 | Fujikawa et al. | 428/281 |
| 4,624,912 | 11/1986 | Zweifel et al. | 156/230 |
| 4,886,774 | 12/1989 | Doi | 427/150 |

*Primary Examiner*—David A. Simmons
*Assistant Examiner*—J. Sells
*Attorney, Agent, or Firm*—Damian Porcari; R. L. May

[57] ABSTRACT

A UV-hard coat protective layer atop an ink transfer surface is provided and a method for manufacturing same. A UV-hard coat layer is applied over a heat transfer ink decal. The invention is primarily directed to the manufacture of rear illuminated instrument dials made from a transparent substrate and heat transfer ink decal. The UV-hard coat layer is applied over the ink decal using a dry heat transfer process and protects the decal from scuffs and abrasions.

1 Claim, 1 Drawing Sheet

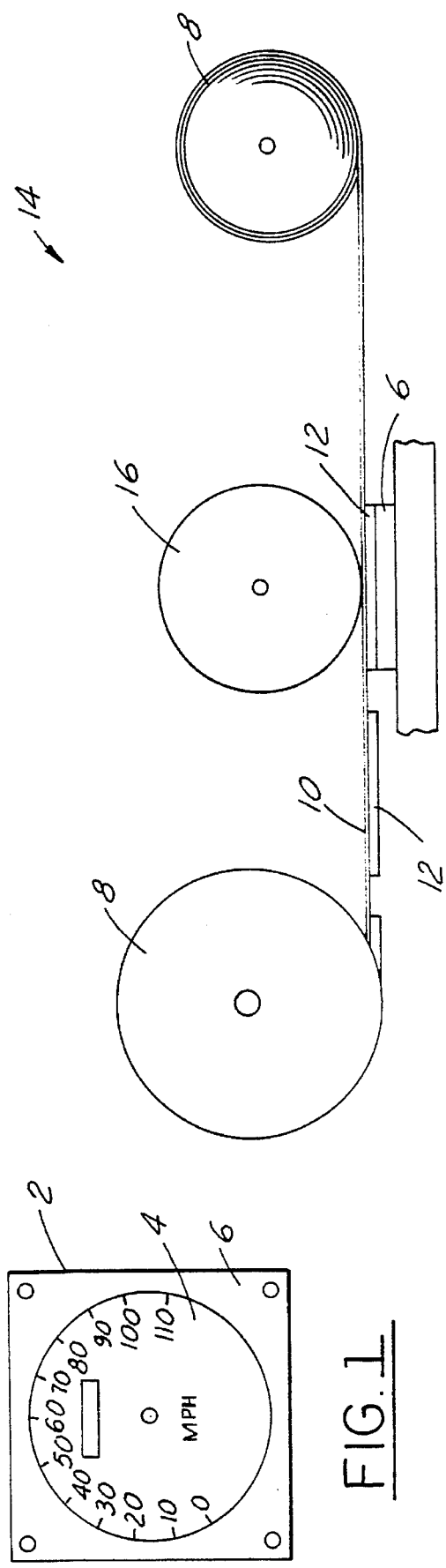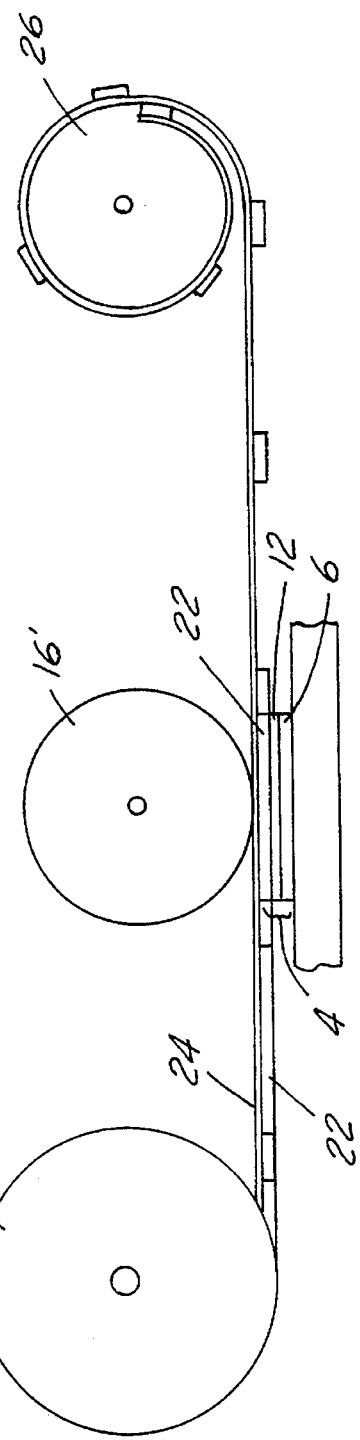

5,484,502

UV-HARD COAT TRANSFER

FIELD OF THE INVENTION

This invention relates to a method of making an ink transfer decal having a UV-hard coat protective layer.

BACKGROUND OF THE INVENTION

It is desirable to manufacture instrument dials having rear illumination. Rear illumination reduces glare on the dial surface and also presents a more attractive appearance. Applique overlays have been widely used for rear illuminated dials. Overlays are produced by printing an image on a thin sheet of transparent material. An adhesive is applied to the back side of the overlay and a release paper is placed atop the adhesive. To manufacture a dial having an overlay, the release paper is removed and the overlay pressed on a clear dial panel substrate.

Overlays are manufactured in individual pieces and then attached to the panel face in a separate assembly process. In an attempt to lower costs and increase the speed of manufacturing instrument dials, dry release ink transfer decals have increasingly been used as a replacement for overlays.

Dry release ink transfer decals are known for making instrument dial face images. An ink transfer layer is applied atop a clear panel substrate usually made of plastic using a heat transfer process. The ink layer is generally carried by a kraft paper. The decal is contacted with the plastic substrate and heat and pressure are applied to adhere the ink transfer to the substrate. The kraft paper carrier is separated from the ink layer so that the ink layer remains adhered to the plastic substrate. The ink layer is extremely fragile. Contact with other objects often mars the dial face image and renders the panel scrap.

The panel undergoes a series of manufacturing operations prior to installation in the vehicle. Electrical and mechanical components are attached to the rear surface of the panel and pointers or needles are attached to it from the dial face surface. Individual dial panels are often assembled into an instrument cluster and installed in the vehicle. All these intermediate assembly steps pose a potential hazard to the fragile instrument dial face. Packaging and handling these fragile dials is slow and cumbersome and increases manufacturing costs.

The largest problem of unprotected ink transfer decals is due to scuffs and scratches. Even slight contact with an object or surface can scuff the ink transfer decal. Scuff marks reflect light differently than the ink layer and are therefore highly visible. Scratches penetrate the ink transfer decal and expose the rear illumination as "light holes."

In an attempt to overcome such difficulties, urethane film layers have been applied atop the ink layer. Such a decal is described in Arnold et al, U.S. Pat. No. 4,308,310. This decal comprises a urethane film and ink layer applied to a backing film. The urethane layer was selected so as to provide flexibility and good adherence to both the ink layer and kraft paper. This type of decal requires the ink transfer layer be applied directly to the urethane film rather than a kraft paper backing. Urethanes do not give the same level of protection as afforded by ultra violet cured hard coats (UV-hard coats). The UV-hard coat provides a very hard surface but does not adhere well to either the kraft paper or ink layer.

SUMMARY OF THE INVENTION

The present invention utilizes a conventional ink transfer applied atop a plastic substrate using a dry transfer process to adhere the ink transfer to the plastic substrate. To protect the ink layer from damage, a UV-hard coat layer is applied atop the ink layer. The UV-hard coat layer is also applied using a dry heat transfer method. The ink transfer coated substrate is placed in a heated roller press. The UV-hard coat transfer is contacted face to face with the ink layer. Sufficient heat and pressure are applied to the UV-hard coat layer to adhere it to the ink layer. The UV-hard coat carrier film is separated leaving behind the UV-hard coat layer atop the ink transfer decal. The UV-hard coat layer protects the dial facia from abrasions and scuff marks.

Instrument dials made using this process are much more resistant to damage from abrasion than ink transfers made without the UV-hard coat layer. Scrapage rates of instrument dials made using this method have reduced significantly. Packaging and handling of UV-hard coat covered ink transfer decals permit some contact with the instrument dials without damage.

Thus it is an object of the present invention to provide a method of applying a UV-hard coat layer atop an ink transfer decal.

Still another object of the present invention is to provide a method of manufacturing instrument dials which are resistant to damage from abrasion.

It is a feature object of the present invention to provide a method of dry manufacturing instrument dials having a UV-hard coat protective layer atop an ink transfer decal.

This and other objects, advantages and features of the invention will be set forth in the detailed description which follows.

BRIEF DESCRIPTION OF THE DRAWING

The earlier mentioned objects, features and advantages as well as others will become apparent to those skilled in the heat transfer art after reading the following description with reference to the accompanying drawings in which:

FIG. 1 is a plan view of an instrument dial panel having ink transfer decal applied thereto.

FIG. 2 is an enlarged sectional view of the ink transfer being applied to a plastic substrate.

FIG. 3 is an enlarged sectional view of the UV-hard coat transfer being applied atop the ink layer.

DESCRIPTION OF THE PREFERRED EMBODIMENT

An instrument dial 2 having dial facia decal 4 is shown in FIG. 1. Dial 2 is of the type commonly used in automotive applications which permits rear illumination of the dial facia. Decal 4 is overlaid substrate 6 and serves as the dial facia for instruments such as speedometers, tachometers, fuel temperature/pressure gauges as well as windows for warning lights and turn signals. Substrate 6 is made from a clear or semi-transparent material. Suitable clear or semi-transparent materials include polycarbonate, glass and acrylic. Polycarbonate is a preferred material for substrate 6 because it will not crack or break from pressure applied in the transfer process or other steps required to manufacture an instrument dial. Decal 4 generally comprises opaque and semi-opaque areas. Opaque areas serve as the background for the dial facia whereas the semi-opaque areas serve as the illuminated dial facia. The illuminated portions include the speedometer numerals and other indicators. These semi-opaque areas may be colored, for example, green for the turn signal indicator and red for the warning lights.

Dial decal 4 is made by applying ink transfer 8 to substrate 6 as shown in FIG. 2. Ink transfer 8 comprises a roll of releasable ink carrier 10 and individual ink layers 12. Ink carrier 10 is made from a wax or polypropylene coated kraft paper which releases the ink layer. Ink layer 12 produces the dial facia and is typically formed by a printing process such as letter press, lithograph, flexography or a screening process.

Dial decal 4 is manufactured by applying ink transfer 8 to plastic substrate 6 using a dry heat transfer process. A roll of ink transfer 8 having a series of dial facias is loaded into heat transfer tool 14. Ink transfer 8 is aligned in heat transfer tool 14 to contact ink layer 12 face to face with substrate 6. A silicone rubber roller 16 heated to about 350° F. presses ink transfer 8 onto substrate 6. Ink layer 12 adheres to substrate 6 and ink carrier 10 is separated from ink layer 12. Spent ink carrier 10 is rolled by take-spool 18. An adhesive coating (not shown) may be applied to over ink layer 12 to better adhere ink layer 12 to substrate 6.

The dry transfer process described up to this point is the current method of manufacturing rear illuminated instrument dials. While dial 2 is still in the heat transfer tool, a UV-hard coat layer is applied atop ink layer 12 to protect decal 4 from abrasion and damage.

The UV-hard coat layer is a relatively thin film of cross linked polymeric material which provides a tough durable coating atop the ink layer to protect the decal from being accidentally damaged in the manufacturing process. The UV-hard coat material is a stable compound which does not yellow even after prolonged exposure to Ultra violet light. This protective layer is applied by the UV-hard coat transfer process shown in FIG. 3.

UV-hard coat transfer 20 comprises a UV-hard coat layer 22 applied to a UV-hard coat carrier 24. UV-hard coat layer 18 may be any clear coating which provides a durable protective coating for ink layer 12. Preferred UV-hard coat materials include UV cured urethanes and acrylics. The UV curing is believed to induce a high degree of cross linking between the polymer chains in the material. This cross linking produces a hard and extremely durable surface which does not stretch or scuff easily. Especially preferred is a UV cured urethane material manufactured by Transfer Print Inc., of East Brunswick N.J. UV-hard coat carrier 24 may be a nylon or mylar film. Especially preferred is a mylar film manufactured by Transfer Print Inc. UV-hard coat transfer 20 is generally made so that the entire surface of UV-hard coat carrier 24 is coated with a layer of UV-hard coat material. Bulk UV-hard coat transfer 20 is rolled into coils so that it may be easily dispensed.

Instrument dial 2, having ink layer 12 applied thereon either remains in the same press transfer tool described above or is transferred to a similar station 14. UV-hard coat transfer 20 is placed atop ink layer 12 so that it contacts UV-hard coat layer 22 face-to-face with ink layer 12. Roller 16, heated to about 350° F., applies pressure to UV-hard coat transfer 20 sufficient to adhere UV-hard coat layer 22 to ink layer 12. Using the preferred UV-hard coat material, no additional adhesive is required to adhere the UV-hard coat layer to the ink layer. Spent UV-hard coat carrier 24 is separated and rolled by take-up spool 26. UV-hard coat layer 22 remains adhered to ink layer 12 and provides abrasion and scuff protection. Dial decal 4 with UV-hard coat layer 22 withstands the remaining manufacturing and assembly steps without damage.

UV-hard coat layer 22 provides abrasion protection for the dial facia without the need of a textured surface. The UV-hard coat layer does not significantly increase surface gloss or unwanted glare and reflection. Additionally, the UV-hard coat layer reduces the amount of ultra violet (UV) light which penetrates to the ink layer. This permits the use of lower cost unstabilized inks for use in the ink transfer.

It should be recognized and understood that the foregoing description of presently preferred embodiments of the invention are presented for exemplification and not limitation of the invention. Certain modifications and variations of the method will be apparent to those skilled in the art in view of the present disclosure and the present or future state of the art, which modifications and variations are intended to be within the scope of the following claims.

I claim:

1. A method of making a rear illuminated instrument dial, having a design surface, said method comprising the steps of:

provicing an ink transfer including an ink carrier film and an ink layer embodying-the design to be transferred;

contacting said ink layer face to face with said dial under conditions of temperature and pressure which causes said ink layer to adhere to said dial;

separating said ink layer from said ink carrier film with said ink layer remaining on said dial;

providing a UV-hard coat transfer including a UV-hard coat carrier coated with a cured UV-hard coat layer;

contacting said UV-hard coat layer face to face with said ink layer under conditions of temperature and pressure which causes said UV-hard coat layer to adhere to said ink layer; and separating said UV-hard coat layer from said UV-hard coat carrier and said UV-hard coat layer remaining on said ink layer.

* * * * *